United States Patent [19]
Meeks

[11] Patent Number: 5,744,212
[45] Date of Patent: Apr. 28, 1998

[54] APPARATUS AND METHOD FOR GATHERING AND REMOVING YARD WASTE

[76] Inventor: Robert J. Meeks, 1303 Sidney St., Fort Wayne, Ind. 46803

[21] Appl. No.: 534,398

[22] Filed: Sep. 27, 1995

[51] Int. Cl.$^6$ ........................................................ B32B 3/24
[52] U.S. Cl. ........................ 428/131; 428/131; 428/134; 428/99; 56/329; 294/1.1; 47/58
[58] Field of Search ........................... 428/131, 134, 428/99; 56/329; 294/1.1; 47/58

[56] References Cited

U.S. PATENT DOCUMENTS

| | | | |
|---|---|---|---|
| 2,766,797 | 10/1956 | Cowen | 294/1.1 |
| 4,366,949 | 1/1983 | Staub, Sr. | 256/1 |
| 4,580,372 | 4/1986 | Osborn | 428/131 |
| 4,738,477 | 4/1988 | Grossmeyer | 294/1.1 |
| 5,417,462 | 5/1995 | Hensley | 294/1.1 |

*Primary Examiner*—William Watkins
*Attorney, Agent, or Firm*—Baker & Daniels

[57] ABSTRACT

The present invention involves an apparatus and method for gathering and removing yard waste. The apparatus includes two parts, a laminar sheet and a plurality of spikes. The laminar sheet is placed on the ground and secured using the spikes. A number of apertures pierce the sheet to allow oxygen to aspirate the plantlife below and to allow water from above to pass through. Clear plastic is preferably used to allow sunlight to reach the plantlife, but other colors and materials are possible if so desired. After leaves, tree limbs, and other yard waste have accumulated on the sheet, the spikes may be removed from the ground and the sheet and waste may be bundled together and discarded.

15 Claims, 1 Drawing Sheet

APPARATUS AND METHOD FOR GATHERING AND REMOVING YARD WASTE

BACKGROUND OF THE INVENTION

1. Field of the Invention

The present invention relates to devices and methods for gathering and removing yard waste. In particular, the present invention addresses the problems, until now unresolved, associated with easily gathering and removing such things as leaves, tree limbs, cones, needles, and the like from a yard.

2. Description of the Related Art

Traditionally, gathering and removing yard waste has been a very labor-intensive activity. After the leaves and limbs have fallen to the ground, a person normally has to rake the waste into a pile, shovel the pile into a container of some sort, and then dispose of the contents of the container. Alternatively, a person could use a engine-powered blower to blow the waste into a pile, shovel the pile into a container, and then dispose of the contents of the container.

Both of these methods have considerable drawbacks. Tools have the potential of breaking down at anytime. The more moving parts a tool has, the greater that potential. A blower, being engine-powered and with a means of delivering forced air, is such a tool. A blower requires maintenance on a regular basis, and eventually replacement. A rake requires less maintenance, but is also prone to damage from impediments such as broken tongs and rust.

Rakes and blowers also require the input of a great deal of energy. When a rake is used, all the energy must derive from the person using the rake. When a blower is used, not only must the person expend energy, but the engine of the blower must also be provided with a source of energy. The two most common energy sources for blowers are electricity and gasoline.

The use of such energy sources creates many problems of their own. First, both gasoline and electricity must continuously be supplied to a blower. This, in turn, creates a continuous expense. Secondly, such blowers pollute the environment through noise, odor, and chemical agents. Thirdly, although a rake requires no gasoline or electricity, the input of labor-hours could also be equated to a sizable expense.

For the foregoing reasons, there is a need for an apparatus and method for gathering and removing yard waste which is maintenance-free, inexpensive, requires little or no labor, odorless, noiseless, and less harmful to the environment than conventional methods.

SUMMARY OF THE INVENTION

The present invention is directed to an apparatus and method of operating the apparatus which satisfies these needs. The apparatus disclosed herein consists of a laminar sheet with breathing holes and a plurality of spikes. The laminar sheet is placed on the ground, secured with the spikes and passively receives falling yard waste. The laminar sheet may then be folded to contain the yard waste, and discarded. Given this configuration, there are no moving parts subject to breaking down, nor is there any maintenance required such as the lubricating and cleaning associated with the prior art.

Aside from the initial purchase price, there is also little expense associated with the present invention. Unlike the prior art devices, which require expenditures for fuel and lubricants, the present invention is a self-contained unit which requires no additional materials. Once the laminar sheet is secured to the ground, the present invention need not be dealt with until the laminar sheet is covered with yard waste, folded into a bundle, and discarded. A new laminar sheet may then be installed if necessary.

Given the passive operation of the invention, the actual gathering of the yard waste requires no labor. Once the laminar sheet is placed on the ground and secured with the spikes, the present invention employs the force of gravity to receive the yard waste. The considerable physical exertion associated with the prior art methods of raking and blowing are simply not required by the present invention.

Moreover, the present invention produces little odors, noise or environmental pollutants. The laminar sheet and spikes are made of an odorless material and do not engage in any process that produces odors, noise or pollutants.

The apparatus for gathering and removing yard waste is comprised of a laminar sheet, and a plurality of spikes. The laminar sheet is made of a recyclable and/or biodegradable material and is perforated with a plurality of apertures. These apertures can be of any reasonable shape which will allow sunlight, oxygen, carbon dioxide, and water to pass through and thereby sustain the plantlife below the laminar sheet. The spikes are required to secure the laminar sheet to the ground to prevent the sheet from being blown away by the elements or carried away by wildlife.

In operation, the laminar sheet is located on an area of ground to receive yard waste. Typically this area is under a tree but, in practice, may include an entire yard including sidewalks and alleys. After being secured with the spikes, leaves and other yard waste may accumulate on the sheet. After an amount of yard waste sufficient to require disposal has accumulated, the spikes are removed from the ground and the sheet may be folded into a bundle and discarded.

The present invention, in one form, is a yard waste gathering and removal apparatus comprising a laminar sheet having a plurality of apertures therethrough and a plurality of spikes. The apertures provide a passageway large enough to allow plantlife-sustaining elements such as sunlight, oxygen, water and carbon dioxide to pass through, while small enough to maintain the physical integrity of the laminar sheet.

The present invention, in another form, is a method for gathering and removing yard waste. The first step is to provide a laminar sheet having a plurality of apertures. The apertures must provide a passageway large enough to allow plantlife-sustaining elements such as sunlight, oxygen, water and carbon dioxide to pass through, while small enough to maintain the physical integrity of the laminar sheet. A plurality of spikes must also be provided as well as an area of ground to receive yard waste. The next step is to place the laminar sheet on the area of ground to be protected. The laminar sheet is then secured to the ground by driving the spikes through the sheet and into the ground. Yard waste then accumulates on the laminar sheet to a point where the waste should be removed. The spikes are then removed from the ground and the sheet and yard waste are folded into a bundle ready for disposal.

One advantage of the present invention is that the apparatus is maintenance-free. There are no moving parts to break down, nor is there any preventative maintenance, such as lubricating, required.

Another advantage of the present invention is that it is an inexpensive alternative to the other options available. Expensive machinery and fuel to operate them are not required. Given that the method of operation requires little human labor, the cost of time involved is also minimized.

A still further advantage is that because the invention requires no motive force, unlike the exhaust fumes of the alternatives, the present invention produces few odors, noxious fumes or undesirable elements.

A still further advantage is that because the invention requires no motive force, the present invention also produces little noise unlike the loud output of an internal combustion engine.

A still further advantage of the present invention is that because the invention requires no motive force, no environmentally unsound chemicals are released by the present invention unlike the output of an internal combustion engine.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
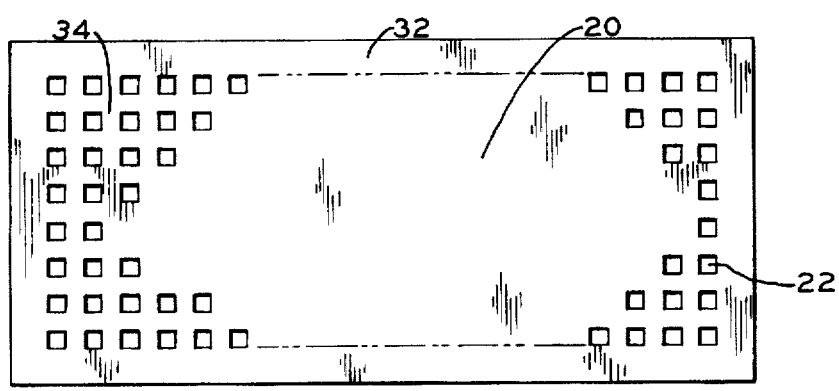
FIG. 1 shows a plan view of the laminar sheet.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate a possible embodiment of the invention, in one form thereof, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Figure 2:
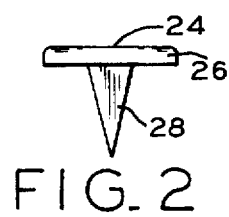
FIG. 2 shows a sectional view of the spike.
Figure 4:
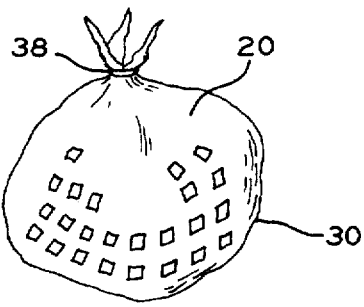
FIG. 4 shows a front view of the laminar sheet after bundling.
Figure 3:
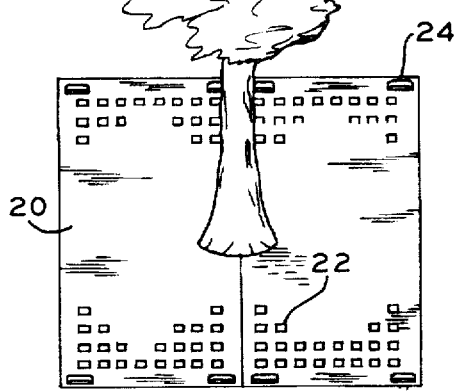
FIG. 3 shows a perspective view of the entire apparatus in operation.
Figure 6:
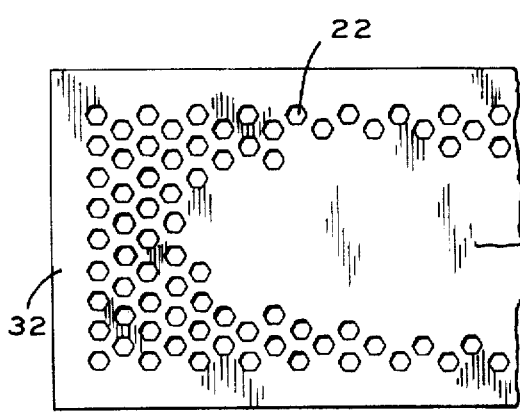
FIG. 6 shows a fragmentary plan view of the laminar sheet with hexagonal apertures.
Figure 7:
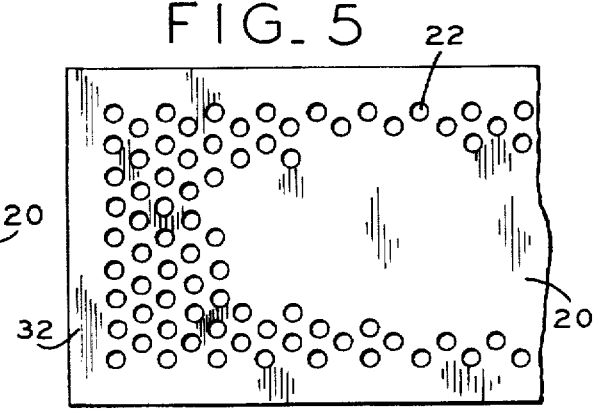
FIG. 7 shows a fragmentary plan view of the laminar sheet with circular apertures.

Referring to FIGS. 1 and 2, the present invention is comprised of a laminar sheet 20 and a plurality of spikes 24. The laminar sheet 20 includes a plurality of apertures 22. Apertures 22 can be any imaginable shape suitable for allowing oxygen, carbon dioxide, sunlight, and water to pass through to the ground below. FIGS. 1, 6, and 7 show three of the possible shapes. FIG. 1 shows square apertures 22, FIG. 6 shows hexagonal apertures 22', and FIG. 7 shows circular apertures 22". These shapes are meant to serve as examples of the possible shapes without limiting this disclosure.

Figure 5:
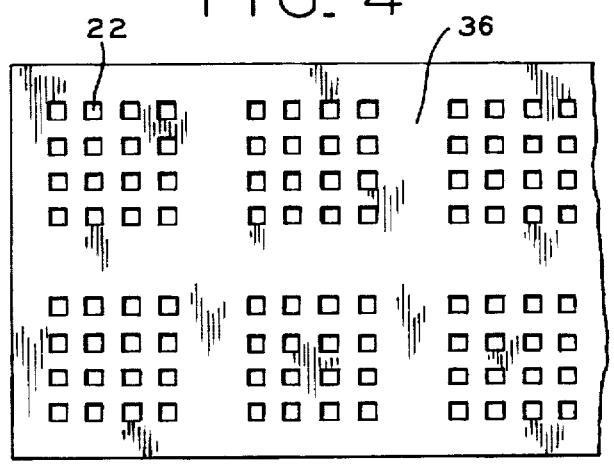
FIG. 5 shows a fragmentary plan view of the laminar sheet with reinforcing strips.

In the exemplary embodiment, the configuration of apertures 22 is uniform throughout laminar sheet 20. Each row and column of apertures 22 is separated by dividing strips 34 of approximately equal width to maintain this uniformity and provide sufficient strength for sheet 20. Sheet edges 32 define the outer boundary without apertures 22. Sheet edges 32 also serve to provide the necessary strength needed to maintain the physical integrity of laminar sheet 20. If a particularly high strength is desired due to the weight and type of yard waste involved, or the thickness and type of the material used, reinforcing strips 36 may be used to provide additional strength as shown in FIG. 5.

In the exemplary embodiment, laminar sheet 20 is made of a clear plastic. In other embodiments, different materials such as collaborated paper or different colors suitable for different uses may be alternatively employed. Also in the exemplary embodiment, laminar sheet 20 is made of a biodegradable material and/or recyclable material. The biodegradable and/or recyclable materials are employed to produce an efficient and environmentally friendly product.

Spikes 24 are also made of a biodegradable and/or recyclable plastic material. In the exemplary embodiment spikes 24 are green, but other suitable colors are possible. Spike 24 is itself comprised of two elements, the head 26 and the conical body 28. Head 26 is of a generally cylindrical shape sufficiently strong to withstand the driving forces needed for insertion into the ground. Moreover, head 26 is sufficiently heavy to resist being swept away by the elements. Conical body 28 is attached to head 26 and is used as a means of piercing the ground when spike 24 is used to secure laminar sheet 20 to the ground. Conical body 28 must be sufficiently long to adequately hold laminar sheet 20 given the dimensions and tensile demands of laminar sheet 20. Spikes 24 may either be discarded with the bundle or removed and reused at a later time.

Turning now to the method of using the apparatus, the first step is to place laminar sheet 20 on the area of ground to be receive the falling yard waste. Laminar sheet 20 is then secured to the area by driving spikes 24 through laminar sheet 20 and into the ground.

The yard waste, including such things as leaves, tree limbs, cones, and the like, then begin to accumulate on laminar sheet 20. Since laminar sheet 20 has apertures 22, sunlight, oxygen and water are able to reach and aspirate the plantlife below, and carbon dioxide is able to escape to the atmosphere.

After an amount of yard waste sufficient for disposal has accumulated on laminar sheet 20, spikes 24 are removed from the ground and laminar sheet 20 is folded into a bundle 30. In the exemplary embodiment, tie-strap 38 is then used to bind laminar sheet 20 and the yard waste into a contained bundle 30. Tie-strap 38 may be of any size and shape suitable for circumscribing bundle 30 and fastening to itself to securely bind bundle 30. Bundle 30 may then be easily discarded. Unless removed, spikes 24 engage laminar sheet 20 and are discarded with bundle 30. However, the present invention allows a user to retain spikes 24 for subsequent uses with additional laminar sheets 20.

The material used to create laminar sheet 20 must be sufficiently strong to support the weight of the yard waste when bundled without being so heavy as to kill the plantlife below when deployed on the ground. Suitable types of material include polyethylene, polypropylene, polyvinyl chloride, and collaborated paper. This list is not meant to be exclusive and other types of similarly characteristic materials may be employed.

The dimensions of laminar sheet 20 must be large enough to efficiently cover any area of ground without being so large as to make bundle 30 unmanageable. This means laminar sheet 20 must also not be so small that an inefficient number of laminar sheets 20 must be used to perform the task of the invention. A sampling of suitable dimensions is 2'×10', 5'×5', 5'×10', and 10'×10'. This list is not meant to be exclusive and other sizes may be effectively employed.

The thickness of laminar sheet 20 is of particular importance to the present invention. The thickness of laminar sheet 20 is a function of both the aforementioned dimensions and type of material used. For example, if a plastic with relatively low tensile strength is used, laminar sheet 20 must be relatively thick. Similarly, if a relatively large dimensioned laminar sheet 20 is used, laminar sheet 20 must also be relatively thick. A suitable range for the thickness of laminar sheet 20 is from about 1/64" to 1/8". Again, as with the types of plastics and the dimensions, this range is not meant to serve as a limitation to this disclosure.

Finally, the dimensions of apertures 22 must be large enough to provide the plantlife below laminar sheet 20 with sufficient amounts of oxygen, water, and sunlight while allowing carbon dioxide to escape to the atmosphere. Additionally, the size of apertures 22 cannot be so large as to sacrifice the necessary strength of laminar sheet 20 or allow pieces of yard waste to escape. A suitable range of apertures sizes is from ½ square inch to 1 square inch.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A yard waste gathering and removal apparatus, comprising:

a laminar sheet having a plurality of apertures therethrough, said apertures adapted to allow communication of air and moisture through said laminar sheet, the area of said laminar sheet between said plurality of apertures defining a plurality of dividing strips, each said dividing strip having a width substantially equal to the width of said apertures, said dividing strips preventing the yard waste from passing through said laminar sheet, said laminar sheet being manufactured from clear material, whereby sunlight is allowed to pass therethrough; and a plurality of spikes engaging said laminar sheet and adapted to attach to the ground.

2. A yard waste gathering and removal apparatus as recited in claim 1 wherein said laminar sheet is made of plastic material.

3. A yard waste gathering and removal apparatus as recited in claim 1 wherein said laminar sheet is made of a recyclable material.

4. A yard waste gathering and removal apparatus as recited in claim 1 wherein said laminar sheet is made of a biodegradable material.

5. A yard waste gathering and removal apparatus as recited in claim 1 wherein said laminar sheet is provided with a perimeter, said plurality of spikes engaging said laminar sheet about said perimeter of said laminar sheet.

6. A yard waste gathering and removal apparatus as recited in claim 1 wherein said laminar sheet is made of a colored material.

7. A yard waste gathering and removal apparatus as recited in claim 1 wherein at least one of said dividing strips is wider than the remaining dividing strips, said at least one wider dividing strip defining at least one reinforcing strip, whereby said at least one reinforcing strip provides said apparatus with additional strength.

8. A yard waste gathering and removal method, comprising the steps of:

providing a laminar sheet and a plurality of spikes, said laminar sheet having a plurality of apertures therethrough, said apertures defining a plurality of passageways adapted to allow communication of air and moisture through said laminar sheet, said laminar sheet having a plurality of dividing strips disposed between said apertures, each said dividing strip having a width substantially equal to the width of said apertures, said dividing strips preventing yard waste from passing through said laminar sheet, said laminar sheet manufactured from a clear material to thereby allow sunlight to pass therethrough, said plurality of spikes engaging said laminar sheet and being adapted to attach to the ground;

locating said laminar sheet on an area of ground to be protected from yard waste;

securing said laminar sheet to the area of ground to be protected from yard waste by driving said spikes through said laminar sheet and into the ground;

removing said spikes from the ground after yard waste has accumulated on said laminar sheet; and folding said sheet and the yard waste into a bundle.

9. A yard waste gathering and removal method as recited in claim 8 further comprising the steps of providing a tie-strap, and binding said bundle with said tie-strap after said folding step.

10. A yard waste gathering and removal method as recited in claim 8 wherein said laminar sheet is made of plastic.

11. A yard waste gathering and removal method as recited in claim 8 wherein said laminar sheet is made of a recyclable material.

12. A yard waste gathering and removal method as recited in claim 8 wherein said laminar sheet is made from a biodegradable material.

13. A yard waste gathering and removal method as recited in claim 8 wherein said laminar sheet is provided with a perimeter and said securing step is performed by engaging said plurality of spikes with said perimeter of said laminar sheet.

14. A yard waste gathering and removal method as recited in claim 8 wherein said laminar sheet is made of a colored material.

15. A yard waste gathering and removal method as recited in claim 8 further comprising the step of providing a laminar sheet wherein at least one of said dividing strips is wider than the remaining dividing strips, said at least one wider dividing strip defining at least one reinforcing strip, whereby said at least one reinforcing strip provides said apparatus with additional strength.

* * * * *